United States Patent [19]
Shannon et al.

[11] Patent Number: 6,120,629
[45] Date of Patent: Sep. 19, 2000

[54] ULTRASONIC PROCESSING

[75] Inventors: Paul T. Shannon, West Lebanon, N.H.; Janice J. Vanselow, Marlboro, Mass.

[73] Assignee: Tyco International (US) Inc., Exeter, N.H.

[21] Appl. No.: 08/912,152

[22] Filed: Aug. 15, 1997

[51] Int. Cl.[7] .................................................. B29C 65/08
[52] U.S. Cl. ...................................... 156/73.1; 156/580.2
[58] Field of Search ................... 156/73.1, 73.3, 156/580.1, 580.2; 264/442, 443, 445; 425/174.2

[56] References Cited

U.S. PATENT DOCUMENTS

| | | |
|---|---|---|
| 4,436,585 | 3/1984 | Moodie et al. .......................... 156/73.1 |
| 4,605,454 | 8/1986 | Sayovitz et al. ........................ 156/73.1 |
| 4,690,722 | 9/1987 | Flood ...................................... 156/510 |
| 5,552,013 | 9/1996 | Ehlert et al. ............................ 156/73.1 |
| 5,672,236 | 9/1997 | Frey ........................................ 156/510 |
| 5,733,411 | 3/1998 | Bett ....................................... 156/580.2 |
| 5,817,199 | 10/1998 | Brennecke et al. ..................... 156/73.1 |
| 5,840,154 | 11/1998 | Wittmaier .............................. 156/580.2 |
| 5,879,494 | 3/1999 | Hoff et al. .............................. 156/73.3 |

*Primary Examiner*—James Sells
*Attorney, Agent, or Firm*—Banner & Witcoff, Ltd.

[57] ABSTRACT

The invention relates to ultrasonically processing a web to produce discrete treated regions across the width of the web, e.g., for use as tearlines in a continuous tape web.

37 Claims, 5 Drawing Sheets

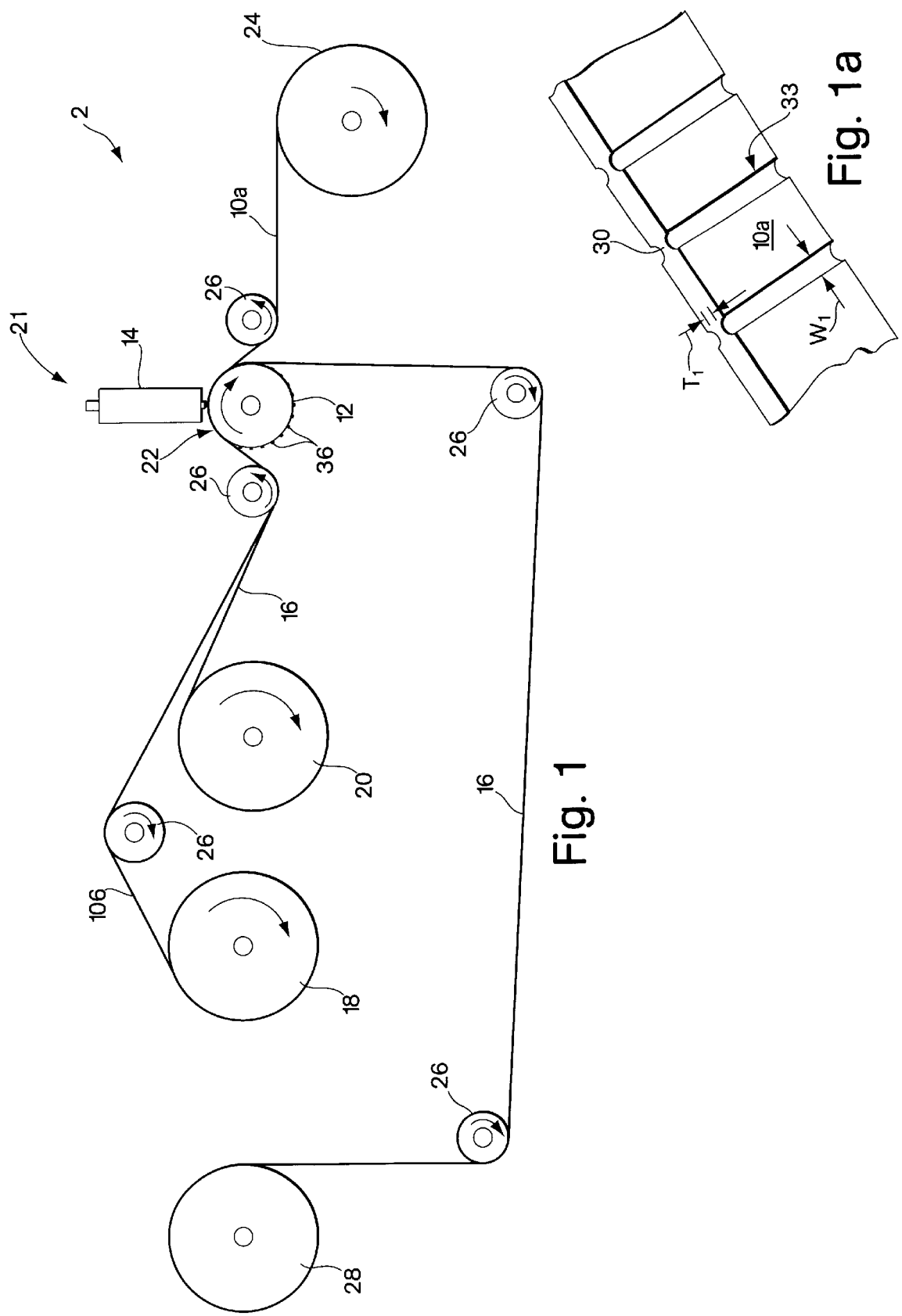

ULTRASONIC PROCESSING

FIELD OF THE INVENTION

This invention relates to ultrasonic processing.

BACKGROUND

Ultrasonic processing is often used to treat materials such as webs. The web is brought between a rapidly vibrating element, referred to as an ultrasonic horn, and another element, referred to as an anvil. The heat generated and pressure of the vibrating horn can be used to treat the web.

Webs are made of a multitude of entangled fibers. The fibers may be entangled in a generally regular pattern, for example, by weaving, or in a more random arrangement, by techniques such as hydroentanglement. The fibers themselves can be of various sizes and materials. By proper selection of the fibers and the entanglement parameters, properties of the web, such as strength and porosity, can be varied, making the web suitable for a particular application.

SUMMARY OF THE INVENTION

In an aspect, the invention relates to ultrasonically processing a strip to produce discrete treated regions across the width of the strip, e.g., for use as tearlines in a continuous tape web.

In one aspect, the invention features a method or an apparatus for processing a strip of ultrasonically treatable material, by feeding the strip lengthwise between a vibrating ultrasonic horn and an anvil, and reducing the distance between the horn and the anvil to create an elongate band of continuously ultrasonically processed material oriented along the width of the strip.

The present invention may include embodiments with one or more of the following. The distance between the anvil and the horn is reduced intermittently to create a series of bands spaced along the length of the strip. The band has a tensile tear strength that is about 70%, 50%, or 33% or less of the tensile tear strength of untreated strip material. The band has a tensile tear strength of about 16 pli or less, e.g., about 4 to 8 pli. The band extends substantially across the full width of the strip.

Alternate embodiments may include feeding a non-bonding strip along with the treatable strip between the horn and anvil. The non-bonding strip may be a paper strip or teflon (polytetrafluoroethylene). The treatable strip is a woven or nonwoven web including synthetic fibers. The web has a thickness of about 0.040 inch or less.

Other embodiments may include an anvil with an elongate curvilinear surface oriented transverse to the width of the strip and rising to a maximum height. The curvilinear surface is a circular surface. The anvil is a rotating cylindrical member having a raised elongate region along the width of the anvil. The anvil includes a series of raised regions. The raised regions are substantially parallel to an axis of the anvil. The raised regions are substantially continuous along a width of the anvil. The strip is fed continuously at a rate of about 50 feet/min. or more. A minimum distance is maintained between the horn and anvil.

In another aspect, the invention features processing a strip with a strip feeder arranged to provide a lengthwise feed of the strip, and an ultrasonic horn and an anvil, the anvil having a nonperforating ultrasonic concentration surface arranged to concentrate ultrasonic energy across the width of the strip in a continuous band.

Certain embodiments may also include a concentration surface with an elongate curvilinear surface oriented transverse to the width of the strip and rising to a maximum height. The curvilinear surface is a circular surface. The surface defines a diameter in the range of about 0.04 to about 0.125 inch. The anvil is a cylindrical, rotatable member. The concentration surface is provided by a series of raised regions spaced on the surface of the anvil. The raised regions are substantially parallel to an axis of the anvil. The raised regions are substantially continuous across the width of the anvil. The anvil includes a series of slots and the raised regions are provided by cylindrical rods in the slots. The rods are removably positionable in the slots. A stop is provided to define a minimum distance between the horn and anvil. The minimum distance is about 0.001 to 0.005 inch. A feeder is arranged to feed a non-bonding strip along with the tearable strip between the horn and anvil.

Implementations of the invention may have certain advantages. For example, uniform, discrete treated regions can be formed across the width at spaced locations along the length of a continuous web for use, for example, in a continuous-roll adhesive tape product. The treated regions can be used as weakened tear lines that exhibit high tear uniformity. A non-bonding treatment aid, such as paper, can be used to enhance ultrasonic action in the treatment of thin, porous webs, and to enable processing of webs already adhesively laminated to release liners which would ordinarily stick to the anvil or horn, or to prevent contaminants from the webs to buildup on the anvil or horn which would limit processing efficiency.

Very thin webs, e.g., less than 0.040 inch (preferably, less than 0.025 inch), can be processed. In addition, the webs can be processed rapidly, e.g., 50 or 100 feet per minute or more, and economically. The webs can be processed with an anvil with a curvilinear surface extending along its axis. Ultrasonic energy is concentrated sufficiently to treat the web only when the surface is opposite the horn. The rounded nature of the surface helps concentrate the energy in a very narrow region. In addition, the rounded surface creates a smooth nip that helps feed the material into and out of the treatment area.

Still further features, aspects and advantages follow. For example, the invention also includes treated strips, products into which the strips are incorporated, and components of an ultrasonic processing system such as an anvil with removable, replaceable energy concentration surfaces.

BRIEF DESCRIPTION OF THE DRAWINGS

FIG. 1 is a schematic of a tape processing system in operation, while FIG. 1a is a greatly enlarged perspective view of a portion of the web after processing with the system;

FIG. 2c is a greatly enlarged side view of area B in FIG. 2a;

DESCRIPTION OF THE PREFERRED EMBODIMENTS

Figure 2A:
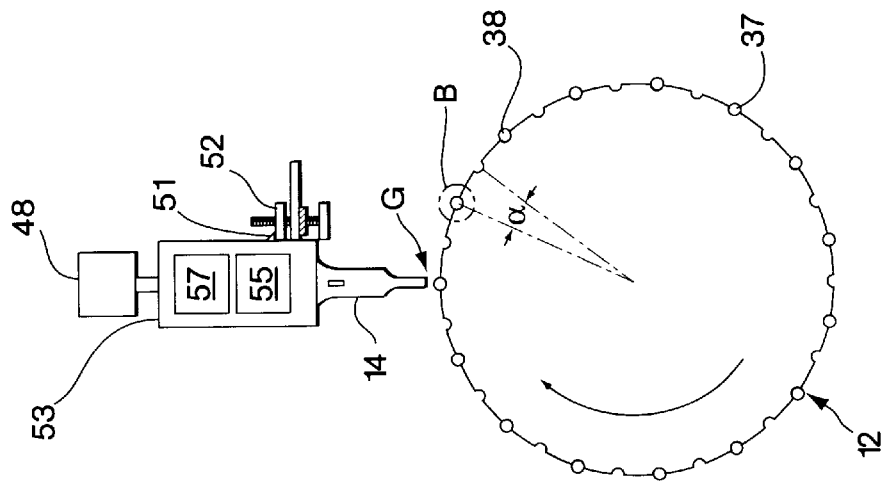
FIGS. 2 and 2a are side and cross-sectional views of an ultrasonic station.

With reference to FIGS. 1–1a, a system 2 for producing a hand-tearable web 10a having opposed faces, includes a supply of raw web 18 on a web feeder, a supply of an ultrasonic treatment aid 20 on an aid feeder, and an ultrasonic treatment station 21. The treatment station 21 includes an ultrasonic horn 14 and an anvil 12 with a rotating cylinder having a series of axially oriented protrusions 36. Preferably, the protrusions are aligned parallel to the axis of the cylinder and parallel to each other, and extend across the entire width of the anvil. Raw web 10b and treatment aid 16, both having a length and a thickness, are fed lengthwise into the treatment station 21 where ultrasonic energy from the horn is concentrated by the axial protrusions of the anvil to form treated regions (or tear lines) 30, of width $W_1$, across the width of the web 10a. The treated regions 30 are substantially linear elongate bands of reduced thickness where the web material has been continuously ultrasonically compressed and melted to some extent. The regions 30 typically have trench-like indentations 33 on either face of the web, with the indentations being separated by a zone of thin, compressed melted or partially melted web. The thickness, $T_1$, of the zone is uniform, lending to smooth, dependable tearability. The treatment preferably does not perforate the web.

The treatment aid, which is fed into the treatment station with the raw web, is preferably a force-transmitting material which does not ultrasonically bond with the web, such as a high-density, super-calendared paper liner. The paper liner enhances the ultrasonic action on the thin web material to produce more uniform tear regions. Processed web 10a is gathered on a take-up roll 24, and paper liner 16 is directed onto a paper liner take-up roll 28 so that the paper liner can be reused. Idler rolls 26 help direct the web material and paper liner during the continuous process.

Figure 2:
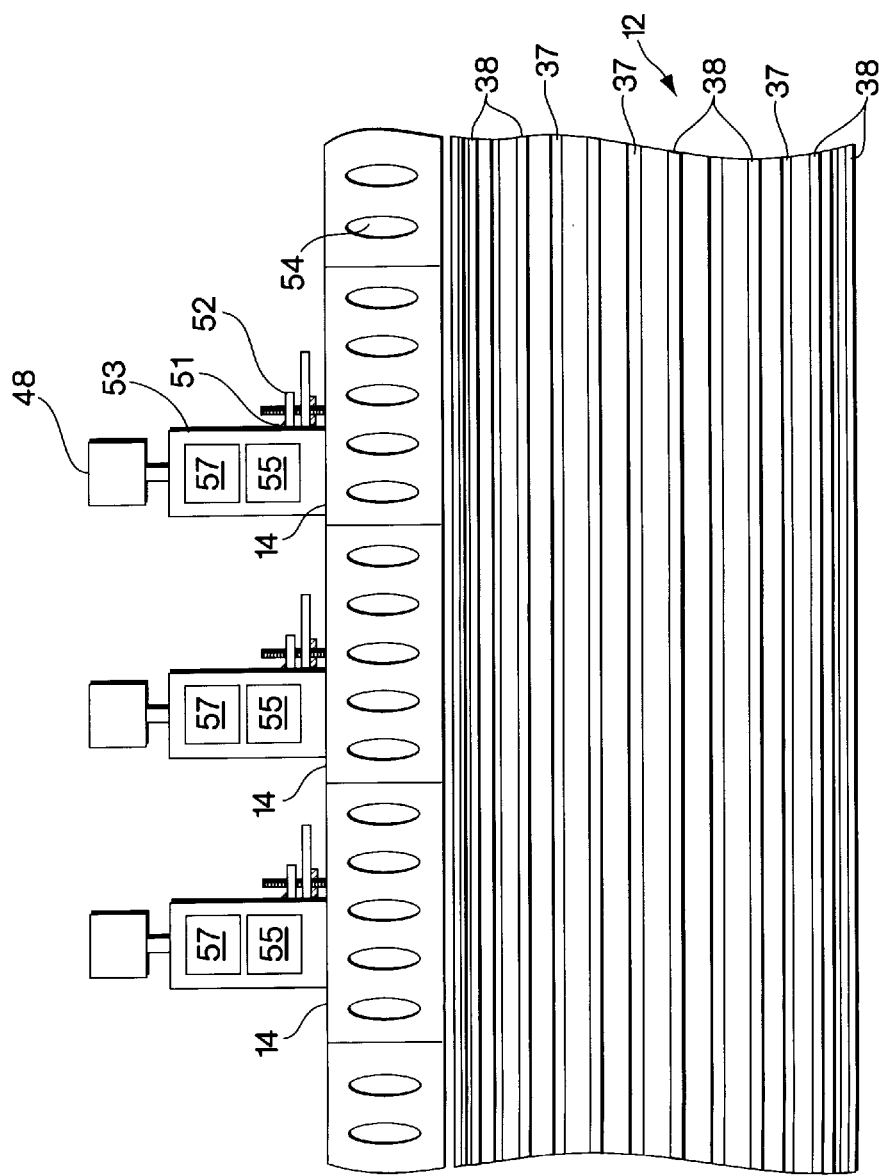
Figure 2B:
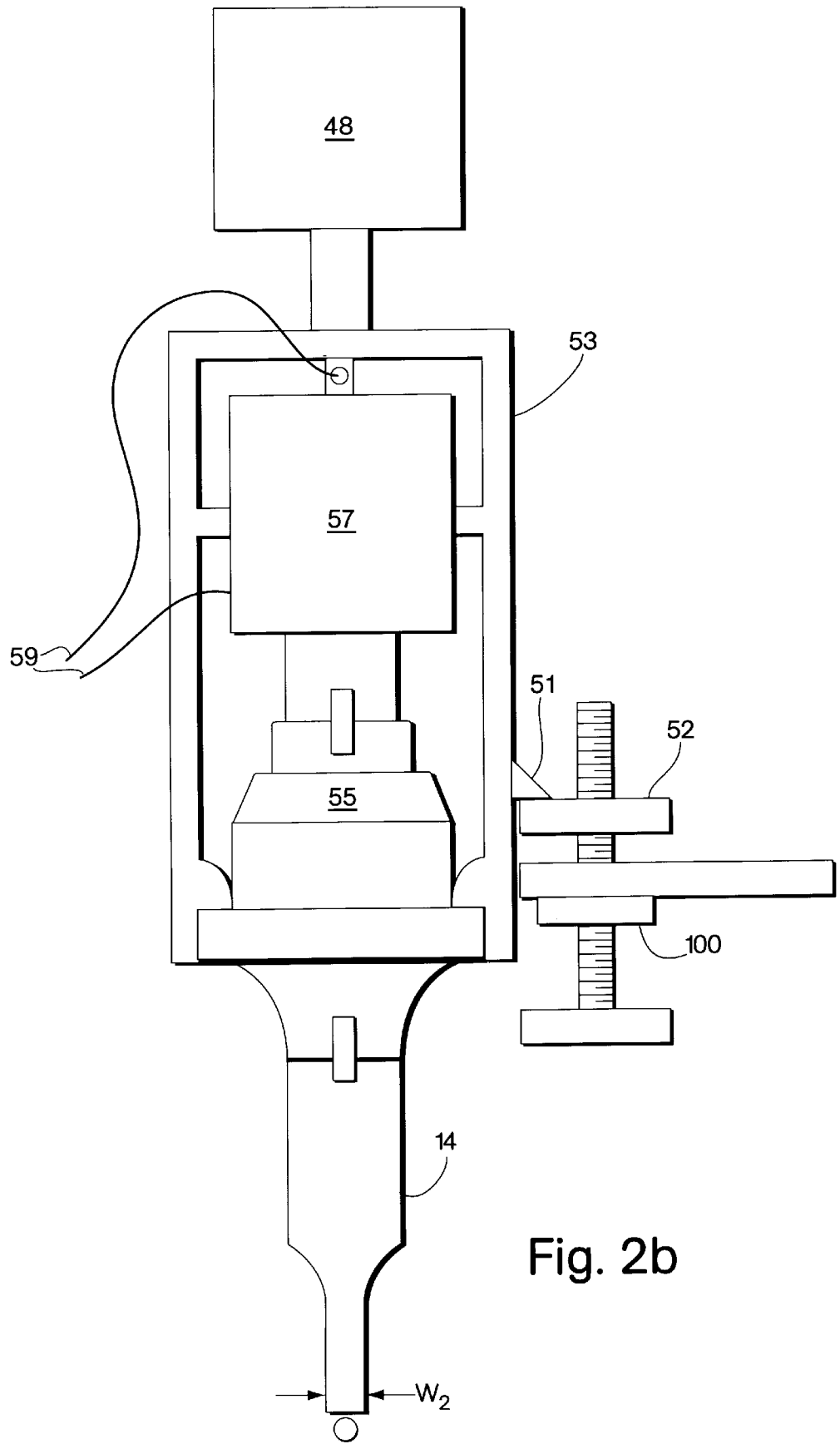
FIG. 2b is an enlarged view of an ultrasonic horn.
Figure 2C:
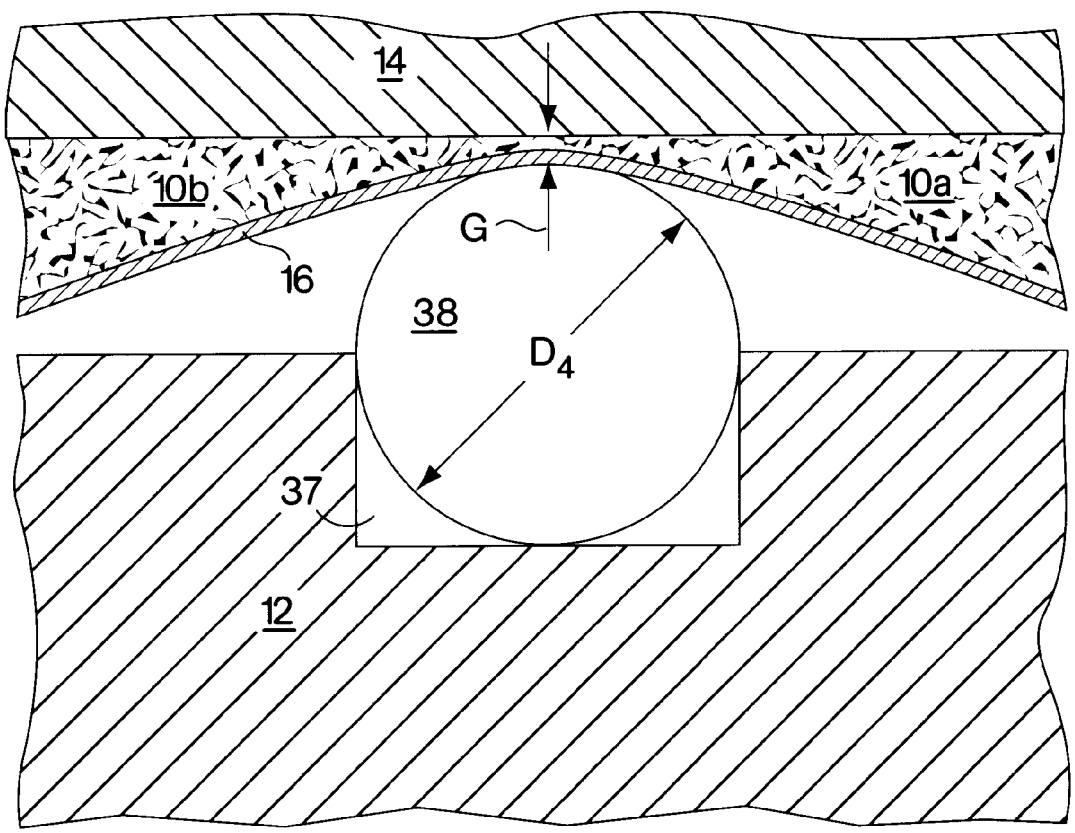

Referring to FIGS. 2–2c, the components of the ultrasonic treatment station are shown in more detail. The anvil 12 includes 30 equally spaced slots 37 on the cylinder surface so that the section angle, α, defined between adjacent slots is about 12°. The slots 37 receive rod members 38. The rod members 38 are cylindrical with a diameter such that they can be press fit into the slots and protrude from the slot beyond the cylinder surface of the anvil. In the embodiment shown, every other slot is provided with a rod. Alternatively, every slot or fewer slots may be provided with rods to vary the spacing of the treated regions in the processed web. The rods may be removed or replaced. In the illustrated embodiments, the curvilinear profile of the rods across the width of the web is circular. The circular profile of the portions of the rods protruding from the cylinder reduces the width of the area at which the greatest concentration of ultrasonic energy occurs. Theoretically, the width corresponds to the point of tangent between the top of the rod and the web. The circular profile also provides a smooth nip-surface which improves feeding the web into and out of the station.

The ultrasonic horn 14 is attached to a converter 57 and a booster 55, both of which are housed in a steel casing 53, which provide the ultrasonic energy. Electrical power is transmitted to converter 57 through leads 59. Converter 57 is a piezoelectric crystal that converts electrical energy to a mechanical vibration. An air cylinder 48 moves the horn/booster/converter assembly up and down. The downward movement causes the horn to press against the web material to be ultrasonically processed. An adjustable stop 52 positioned adjacent to steel casing 53 limits the downward travel of the horn/booster/converter unit by engaging housing stop 51, and, therefore, ensures that there is a minimum distance, a gap, G, between ultrasonic horn 14 and the top of each rod 38. The height of adjustable stop 52 is adjusted by thumb wheel 100. Typically, the gap G is about 0.001 inch to about 0.005 inch. Motion of the horn unit upward is permitted and occurs as the rod and fabric pass directly under the ultrasonic horn. The width of the horn is typically greater than the diameter of the rod. For example, the horn may have a width, $W_2$, of about 0.75 inch. The ultrasonic horn 14 generates pressure waves with a frequency of about 20,000 Hz. The generation of these pressure waves and resultant material friction produce heat and pressure which melts the web material to form narrow lines of ultrasonically treated material which typically are weaker than the base fabric, for use, e.g., as tear lines. Horns 14 further include cooling holes 54 to prevent overheating of the horns. Suitable horns are commercially available, for example, Branson model 48-014-020, available from Branson Ultrasonics Corp., Danbury, Conn. In the present configuration, a series of ultrasonic horns is positioned in a line along the axis of anvil 12. Alternatively, the horns could be staggered around a portion of the circumference of anvil 12 in which case the ultrasonic action of each horn would overlap, in the axial direction of anvil 12, a portion of that of an adjacent horn.

The web may be a woven or non-woven web of natural or synthetic fibers. The web will include at least as a component a material that can be compacted and/or melted by ultrasonic action. In one example, the web is made of hydroentangled polyester fibers, e.g., HEF with a thickness of about 0.020 inch. Thicker webs may be processed, e.g., of thickness of about 0.080 inch. The processing techniques may also be useful for non-web materials, such as films. The web can be fed into the treatment station at, e.g., about 100 ft/min.

The ultrasonic treatment aid, as mentioned above, is preferably a high-density, super-calendared paper product. The treatment aid acts to intensify and distribute the ultrasonic energy evenly. The treatment aid also reduces the effects of small diameter difference in the anvil or rods or web thickness. The treatment aid is most useful when processing thin webs, e.g., less than about 0.040 inch, such as around 0.020 inch or less. The thinner webs are less susceptible to ultrasonic action than thicker webs. With multiple thin webs such as two or three 0.020 inch thick non-woven webs or one web greater than 0.040 inch in thickness, the paper treatment aid is typically not used. A preferred treatment aid is 42 lb. Release Liner base paper stock with a silicone precoat available from Otis Specialty Paper, Brewer, Me., which has a thickness of about 0.0025 inch and a typical measured weight of 40.8 lb/3000 ft$^2$. The paper is fed into the treatment station with the raw web at the same or somewhat slower rate. For example, the paper liner can be fed at ⅛ the feed speed of the web. The paper liner can be reused. Although the paper liner has been illustrated positioned between the web material and anvil, the paper liner can also be positioned between the web material and the ultrasonic horn. Liner can also be positioned on both sides of the web.

Figure 3:
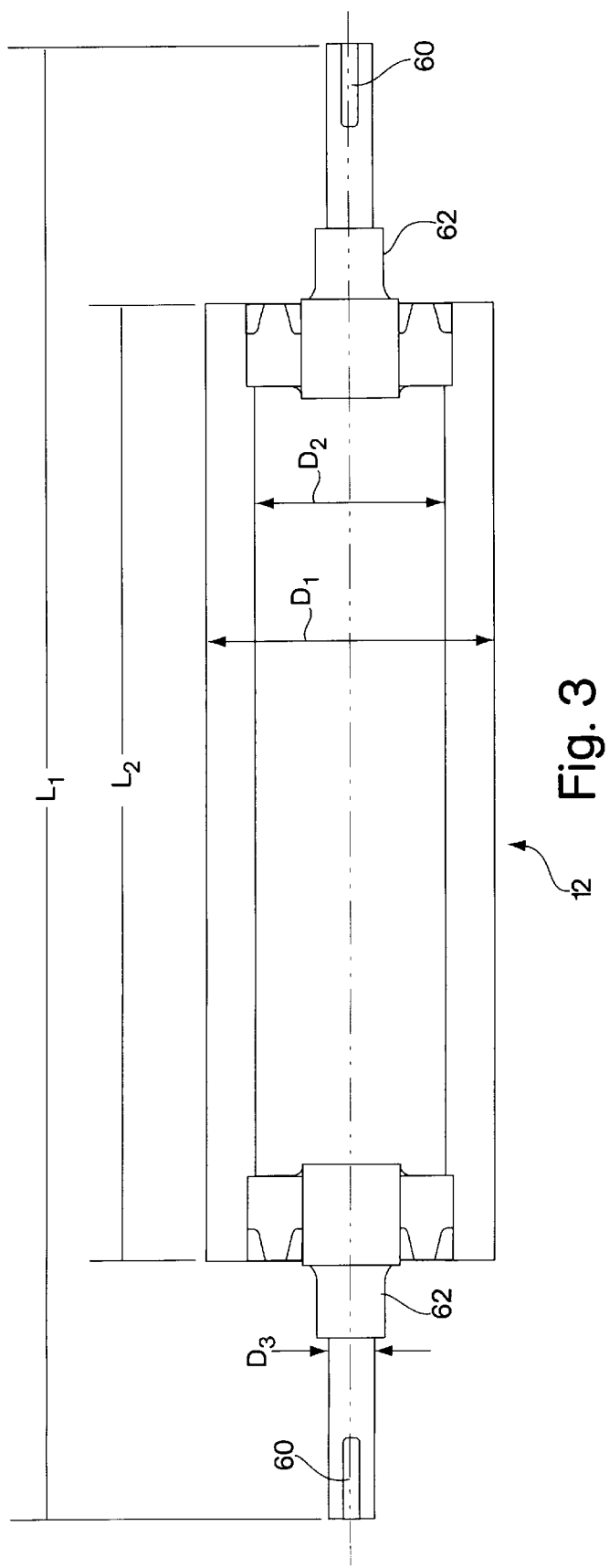
FIG. 3 is a side view of a cylindrical anvil.

Referring as well to FIG. 3, the dimensions of a particular anvil are illustrated. It has an outer cylinder nominal diameter, $D_1$, of about 9.75 inches, an inner bore diameter, $D_2$, of about 7 inches, an overall length, $L_1$, of about 84.5 inches, in which the width, $L_2$, of the cylindrical body is about 60 inches. The width of the anvil protrusions are typically selected so that it is somewhat shorter, e.g., about one inch shorter, than the web so that there is an untreated border region on either side of the web. This reduces the likelihood of inadvertent tearing of the web as it is tensioned in subsequent processing, such as rolling and/or adhesive application. Before use, the web can be trimmed to remove the untreated margins.

Anvil 12 also includes two keyways 60 for connecting to drive wheels. A drive mechanism (not shown) is connected to the drive wheels for rotating anvil 12. Anvil 12 is supported by bearings (not shown) ring fit onto cylindrical journals 62 which have a diameter, $D_3$, of about 1.5 inches. Anvil 12 is made from hot rolled seamless tube steel and machined to a surface total indicated runout (TIR) no greater than 0.0002 inch and a taper no greater than 0.0002 inch. A suitable anvil may be available from KRH Rolls, Inc., Orange, Mass. The slots 37 are precision cut by placing the cylinder in a Y-block and using a CNC milling machine with high precision solid carbide saws (for example, by AMBRIT, Wilmington, Mass.) to cut slot 37 across the cylinder. The slots have a preferred width of about 0.071 inch ±0.0001 inch, a depth of about 0.046 inch ±0.0001 inch, and are parallel to the cylinder axis within about 0.0002 inch, i.e. the taper is about 0.0002 inch. The cylinder is then plated with about 0.001 inch of electroless nickel to protect it from corrosion by binders and dyes that might be in the web.

Cylindrical rods 38 have a diameter, $D_4$, of about 0.072 inch. The rods are precision ground to +0.0000 inch, −0.0002 inch. The rods are press fit into a slot 37 and extend about 0.026 inch above the surface of anvil 12. If the TIR of the rod tops exceed 0.0005 inch, then the anvil undergoes a final precision grind such that the rod tops are within a TIR of 0.0003 inch. The rods may be press fit by pounding against a block of nylon. Suitable rods made from 316 stainless steel may be obtained from Boston Centerless, Boston, Mass. The first time the anvil is used, preferably all rods are set one at a time. The rod is positioned under the horn, and several layers of fabric are placed over the rod. The horn is ultrasonically pulsed several times at maximum pressure to set the rod so that the rod is firmly held in the slot. Each horn is individually adjusted to position the horn axially parallel to the rod, for example, by using side screws, and to set the 0.001 inch gap using vertical stop adjustment. The uniform gap may be set by using a feeler gauge. Final gap adjustment is made using test material to obtain uniform welds across the horn width to compensate for non-uniformities caused by non-uniform behavior of the individual air cylinders, horns, and power supplies. Adjustment of the horns can also compensate for any minor taper misalignment.

The system can be arranged for various applications. For example, the level of weakening of the treated bands can be varied by controlling the rate of web feed, the frequency and power of the horn, the shape and width of the anvil and the spacing. Increasing the web feed rate reduces the ultrasonic energy applied to the treated regions because it reduces the dwell time under the horn. A higher frequency will increase the energy since more treatment occurs in the time that the anvil is in close to the horn. A narrower rod increases input of ultrasonic energy. Preferably, the anvil rods have a diameter of about 0.040 to 0.125 inch.

A measure of hand tearability and process performance is the tensile strength at break using the method ASTM D-1000. For tearlines, preferably the treated band extends all the way across the width of the web (after trimming) and has a tensile tear strength of about 16 pli or less, e.g., about 4 to 8 pli. The band preferably has a tensile tear strength that is about 70% or less, e.g., 50% or 30%, of the tear strength of the untreated material. The system is also capable of welding multiple sheets of raw web together which can be torn at the weld line.

EXAMPLE

Web material was processed using an anvil with a diameter of 4 inches and a width of 18 inches. The anvil slots were cut by AMBRIT, of Wilmington, Mass. The slots had a depth of about 0.040 inch ±0.0002 inch, and a width of about 0.0650 inch. The anvil included 6 rods, each with a diameter of 0.0659 inch, equally spaced with the rod tops precision ground for a TIR of 0.0003 inch and a taper of 0.0003 inch. A web was processed using the following parameters:

| Operating Parameters: | |
| --- | --- |
| Raw web material: | 16 inch × 0.020 inch, 44 gm/yd² HEF product D550174 100% polyester fibers, Veratec, Walpole, MA |
| Ultrasonic aid: | 16 inch × 0.0025 inch 42 lb LO-NO Release Liner, Otis Specialty Paper, Brewer, ME |
| Raw web feed: | 100 ft/min |
| Ultrasonic aid feed rate: | 100 ft/min |
| Horn/Anvil minimum spacing: | 0.001 inch |
| Anvil rotation rate: | 95.6 rpm |
| Rod spacing: | 60° (2 inch circumferential spacing) |
| Horn power: | 250 Watts |
| Horn preload: | 21 pli (pounds per linear inch) |
| Horn: | 7 ¼ inch × ¾ inch Pinsonic, 20 Khz (two horns along the anvil axis) |
| Branson Silver Booster | (1.5:1) (Model No. 101-149-053 available from Branson Ultrasonics, Corp., Banbury, CT) |

A web processed using the parameters had the following characteristics:

| Processed Web: | |
| --- | --- |
| Treated region across the width of the strip: | 14.5 inch |
| Treated region thickness, $T_1$: | About 0.005 inch |
| Treated region spacing along the length of the strip: | 2.0 inch |
| Treated region width, $W_1$: | 0.030 inch to 0.050 inch |
| Tensile tear characteristics: | ASTM D-1000 |
| Sample size: | 1 inch wide × 4 inches long |
| Instron Jaw Gap: | 2 inches; band positioned in middle of jaws |
| Pull Rate: | 12 inches/minute |
| Tensile tear strength of untreated region: | 24.7 pli; stdev: 2.2 pli |
| Tensile tear strength of treated region: | 4 to 14 pli (Average: 8 to 9 pli) |

The treated regions exhibit a uniform, thin zone without creating perforations in the web material. The treated regions were easily torn by hand giving straight tears with minimal further pull-out along the tear line.

Further Embodiments

In embodiments the raised region on the anvil may not be continuous across the width of the cylinder. For example, a series of closely spaced, aligned rod-nubs may be used. The raised region may have a desired, varying profile across the width of the strip. The profile may be curvilinear and non-circular. In further embodiments, the anvil could be produced by removing material from the surface of a cylindrical body by electrical discharge machining (EDM) or by some other method so that axial ridges of the anvil cylindrical surfaces are left after machining. The raised ridges are machined so that the cross section of the raised ridges are trapezoidal in shape having a narrow top surface 0.010 inch wide and a broader base. The cross section could be half round in shape. This is desired to prevent ridge breakage. In this embodiment, the top surface width should be kept as narrow as possible.

The processed web can be incorporated in adhesive tapes by applying adhesive to one or both surfaces or adhesive to one surface and a release agent to the other surface. The web material can be laminated to an adhesive on a release liner and then treated to form tear lines. In this case, the adhesive release liner can serve as the ultrasonic aid. A second layer of paper on top of the fabric may be used to prevent adhesive buildup on the anvil and ultrasonic horn during continuous operation. This multi-layer technique using suitable release liners on the top and bottom might also be used to process webs which ordinarily would stick to the horn or anvil preventing ultrasonic treatment if run by themselves, or the treated web material can be subsequently laminated with the adhesive on the release liner. The tapes can be used, for example, as medical tapes.

The process can also be used for welding multiple webs together by feeding multiple webs simultaneously to make multi-layer tearable tapes.

What is claimed is:

1. A method of processing a strip of ultrasonically treatable material, comprising:
    feeding the strip lengthwise between a vibrating ultrasonic horn and an anvil, and
    reducing the distance between the horn and the anvil to create an elongate band of continuously ultrasonically processed material oriented along the width of said strip having a tensile tear strength less than untreated strip material.

2. The method of claim 1 comprising intermittently reducing the distance between the anvil and the horn to create a series of said bands spaced along the length of said strip.

3. The method of claim 1 or 2 wherein said band has a tensile tear strength that is about 70% or less of the tensile tear strength of untreated strip material.

4. The method of claim 3 wherein said band has a tensile tear strength that is about 50% or less of the tensile tear strength of untreated strip material.

5. The method of claim 3 wherein said band has a tensile tear strength that is about 33% or less of the tensile tear strength of untreated strip material.

6. The method of claim 1 or 2 wherein said band has a tensile tear strength of about 16 pli or less.

7. The method of claim 6 wherein said band has a tensile tear strength of about 4 to 8 pli.

8. The method of claim 1 or 2 wherein said band extends substantially across the full width of said strip.

9. The method of claim 1 comprising:
    feeding a non-bonding strip along with said treatable strip between said horn and anvil.

10. The method of claim 9 wherein said non-bonding strip is a paper strip.

11. The method of claim 9 wherein said non-bonding strip is polytetrafluoroethylene.

12. The method of claim 1 wherein said treatable strip is a woven or nonwoven web including synthetic fibers.

13. The method of claim 12 wherein said web has a thickness of about 0.040 inch or less.

14. The method of claim 1 wherein said anvil includes an elongate curvilinear surface oriented transverse to the width of said strip and rising to a maximum height.

15. The method of claim 14 wherein said curvilinear surface is a circular surface.

16. The method of claim 1 wherein said anvil is a rotating cylindrical member having a raised elongate region along the width of the anvil.

17. The method of claim 16 wherein said anvil includes a series of raised regions.

18. The method of claim 17 wherein said raised regions are substantially parallel to an axis of said anvil.

19. The method of claim 18 wherein said raised regions are substantially continuous across the width of said anvil.

20. The method of claim 1 comprising continuously feeding said strip at a rate of about 50 feet/min. or more.

21. The method of claim 1, 16, 17, or 19 comprising maintaining a minimum distance between the horn and anvil.

22. A method of processing a continuous strip of ultrasonically treatable material to form tear-lines across the width of said strip, comprising:
    providing a treatable strip of web material,
    continuously feeding the strip lengthwise between an ultrasonic horn and an anvil, said anvil being a rotating cylindrical member having a raised elongate member of curvilinear cross-section extending along the width of the anvil such that the distance between the anvil and the horn is intermittently reduced, creating elongate bands of continuously ultrasonically processed material substantially across the width of said strip that have a tensile tear strength of about 16 pli or less.

23. An ultrasonic system for processing a strip, comprising:
    a strip feeder arranged to provide a lengthwise feed of said strip, and
    an ultrasonic horn and an anvil, said anvil having a nonperforating ultrasonic concentration surface arranged to concentrate ultrasonic energy across the width of said strip in a continuous band.

24. The system of claim 23 wherein said concentration surface has an elongate curvilinear surface oriented transverse to width of said strip and rising to a maximum height.

25. The system of claim 24 wherein said curvilinear surface is a circular surface.

26. The system of claim 25 wherein said surface defines a diameter in the range of about 0.04 to about 0.125 inch.

27. The system of claim 23 wherein said anvil is a cylindrical, rotatable member.

28. The system of claim 27 wherein said concentration surface is provided by a series of raised regions spaced on said surface of said anvil.

29. The system of claim 28 wherein said raised regions are substantially parallel to an axis of said anvil.

30. The system of claim 29 wherein said raised regions are substantially continuous along a width of said anvil.

31. The system of claim 28 wherein said anvil includes a series of slots and said raised regions are provided by cylindrical rods in said slots.

32. The system of claim 31 wherein said anvil said rods are removably positionable in said slots.

33. The system of claim 23, 27, 28, or 30 including a stop to define a minimum distance between the horn and anvil.

34. The system of claim 33 wherein said minimum distance is about 0.001 to 0.005 inch.

35. The system of claim 21 further including a feeder arranged to feed non-bonding strip along with said tearable strip between said horn and anvil.

36. An ultrasonic system for processing a strip, comprising:

a strip feeder arranged to provide a lengthwise feed of said strip to an ultrasonic station, said station including an ultrasonic horn, and a cylindrical, rotatable anvil, having a nonperforating ultrasonic concentration surface arranged to concentrate ultrasonic energy across the width of said strip, said concentration surface being an elongate raised region along the width of the anvil with a curvilinear surface oriented transverse to the width of said strip and rising to maximum, and a stop configured to define a minimum distance between the horn and the raised region.

37. The system of claim 36 wherein said raised member is a cylindrical rod removably fit into a slot on the anvil.

* * * * *